United States Patent [19]

McNeely et al.

[11] 3,855,031
[45] Dec. 17, 1974

[54] METHOD AND APPARATUS FOR LAMINATING, IMPREGNATING AND CURING CONTINUOUS TUBES

[75] Inventors: Arthur O. McNeely, Redondo Beach; Wiley T. Kennedy, Santa Ana; Paul Huska, Los Angeles, all of Calif.

[73] Assignee: Mackenhus Corporation, Santa Ana, Calif.

[22] Filed: Feb. 16, 1972

[21] Appl. No.: 226,811

[52] U.S. Cl................. 156/190, 156/195, 156/200, 156/273, 156/428, 156/463
[51] Int. Cl............................................. B31f 1/00
[58] Field of Search .......... 156/425, 430, 432, 103, 156/105, 392, 272, 278, 173, 175, 461, 463, 466, 171, 177, 190, 195, 200; 93/83

[56] References Cited
UNITED STATES PATENTS

| | | | |
|---|---|---|---|
| 2,664,793 | 2/1954 | Dunlap | 93/83 |
| 3,067,803 | 12/1962 | Fleury | 156/431 |
| 3,083,130 | 3/1963 | Strandquist | 156/499 X |
| 3,328,224 | 6/1967 | Kennedy et al. | 156/432 X |
| 3,497,413 | 2/1970 | Uilman et al. | 156/425 |
| 3,503,828 | 3/1970 | Walter | 156/392 X |
| 3,532,579 | 10/1970 | Havens et al. | 156/431 |
| 3,601,159 | 8/1971 | Marks et al. | 156/177 X |

Primary Examiner—Charles E. Van Horn
Assistant Examiner—David A. Simmons

[57] ABSTRACT

A method and apparatus for application to a pultrusion machine and adapted to produce continuous lengths of cured resin impregnated laminated tubing; characterized by dry forming lay-up of the laminiform followed by resin impregnation, the process and/or operation of the apparatus being dynamic and continuously operative with improved pre-heating of the composite laminiform for controlled accelerated curing. The said dry forming comprises the lay-up of at least one lamina and preferably a multiplicity of laminae which are rotatively displaced and folded onto and advanced along a stationary mandrel. The resin impregnation comprises internal pressure application thereof through the laminiform wall and purging all gases therefrom. The pre-heating is by means of a unique Radio Frequency grid that efficiently embraces the manifold supported laminiform, and the curing comprises the internal and external application of heat with the said internal heat being applied by fluidics compatible with said Radio Frequency pre-heating; and all to the end that a high rate of production is acquired, limited only by the temperature-time curing capability of the particular resin employed.

6 Claims, 17 Drawing Figures

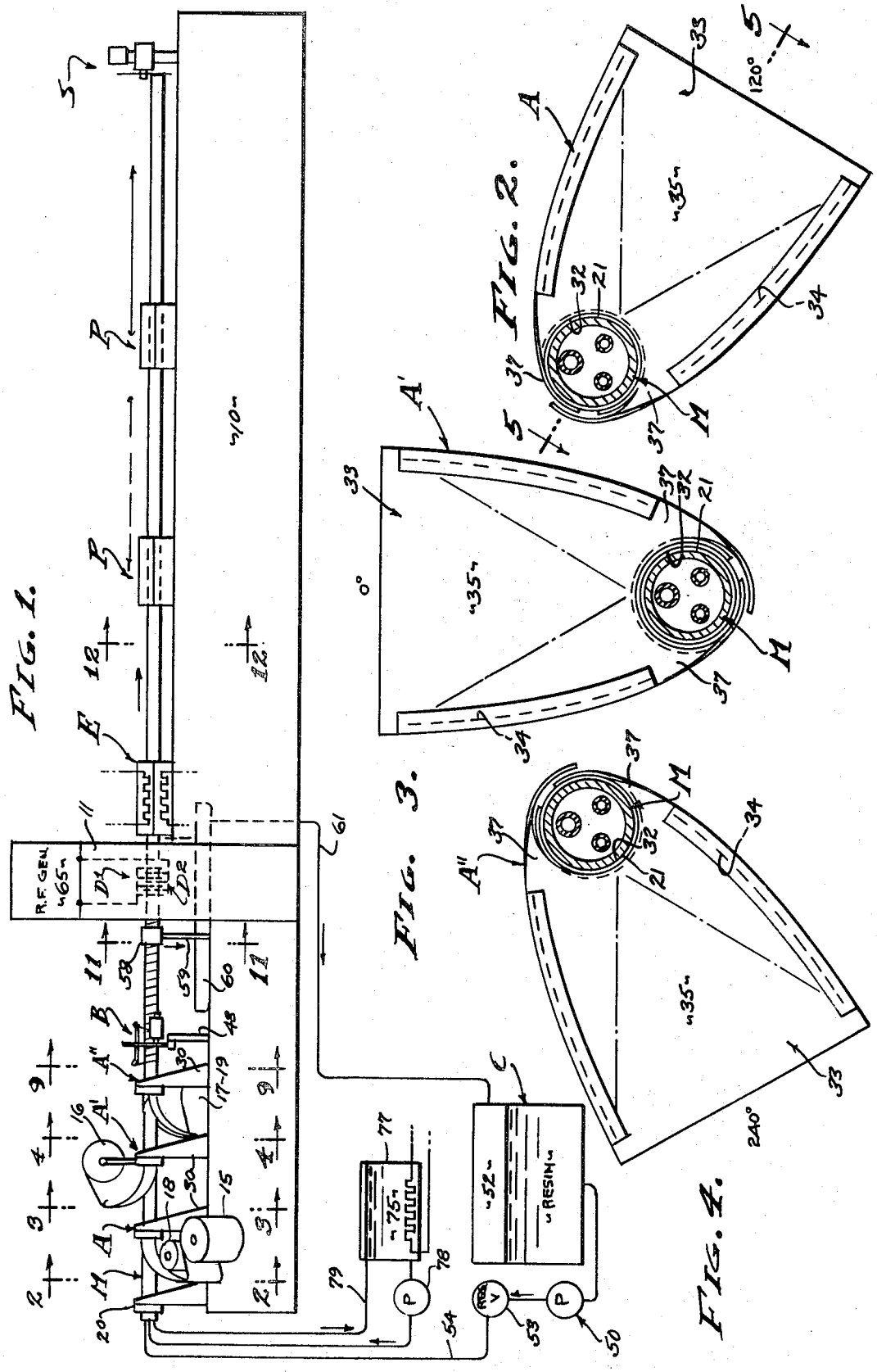

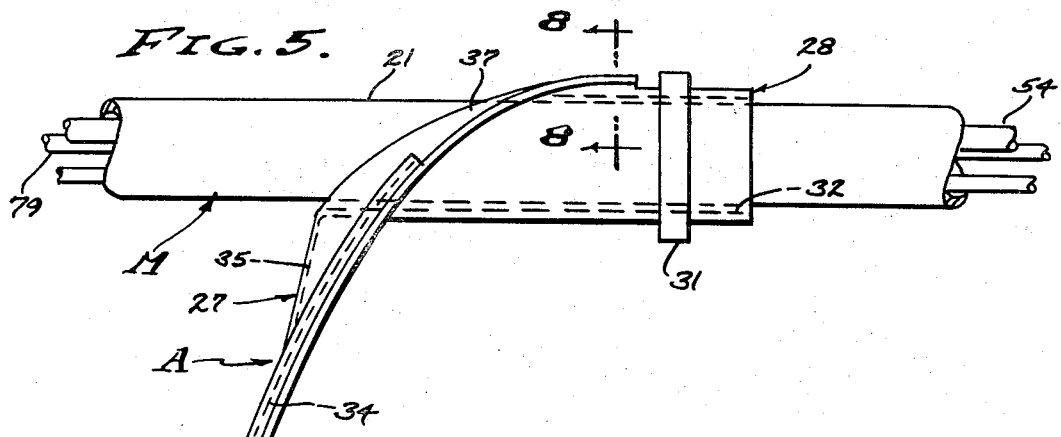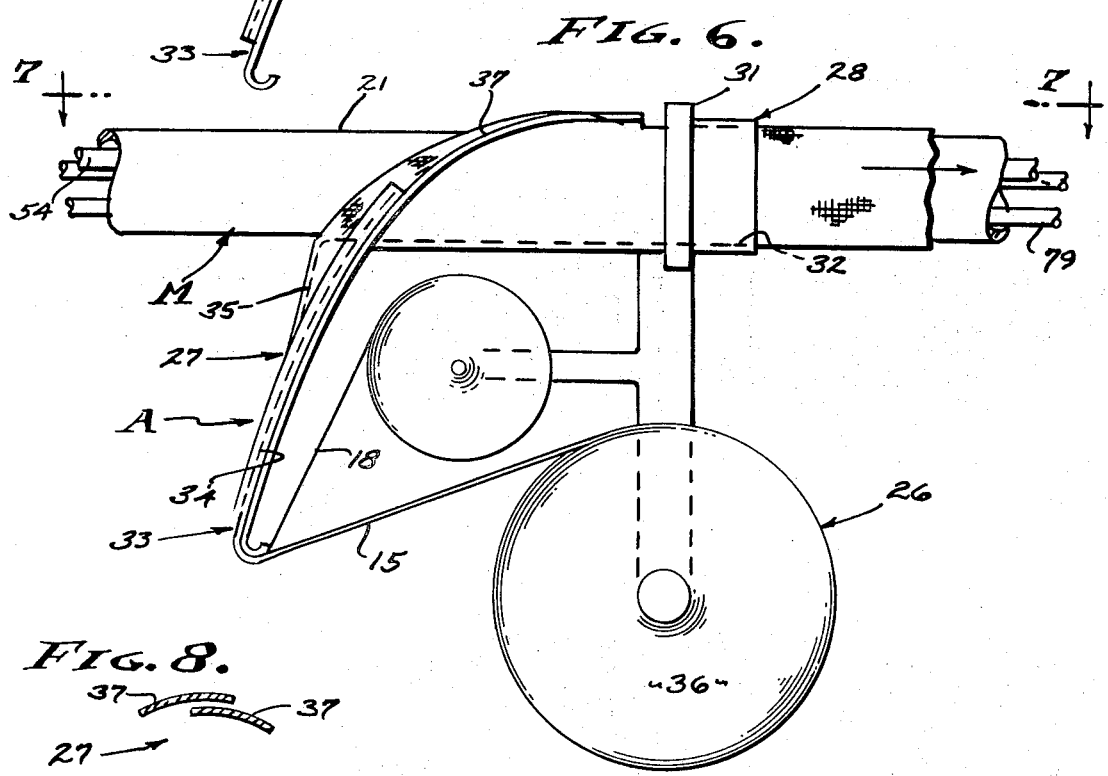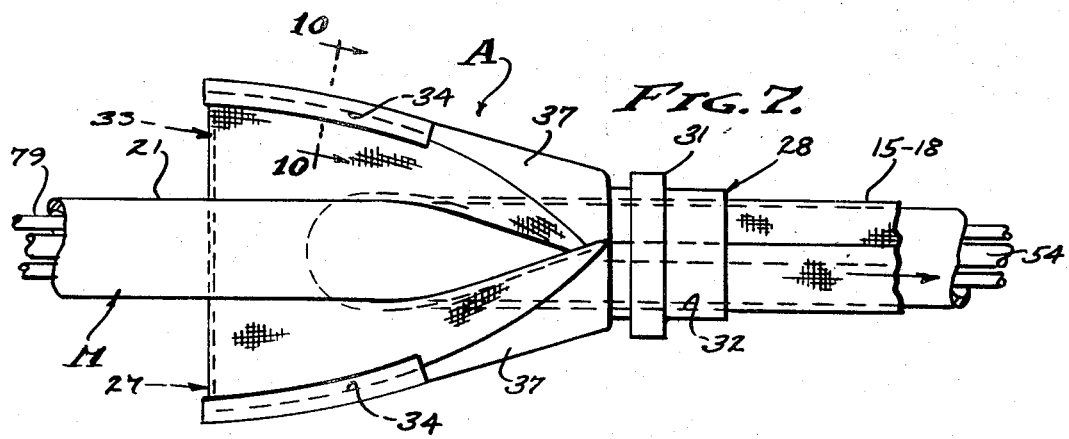

COMPOSITE PROFILE

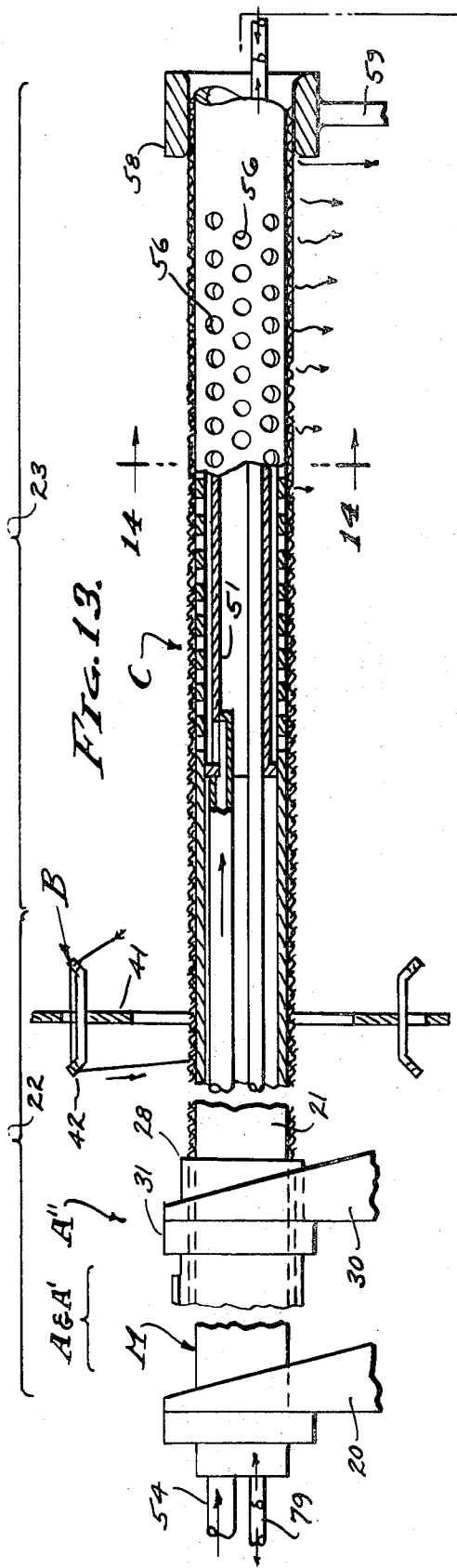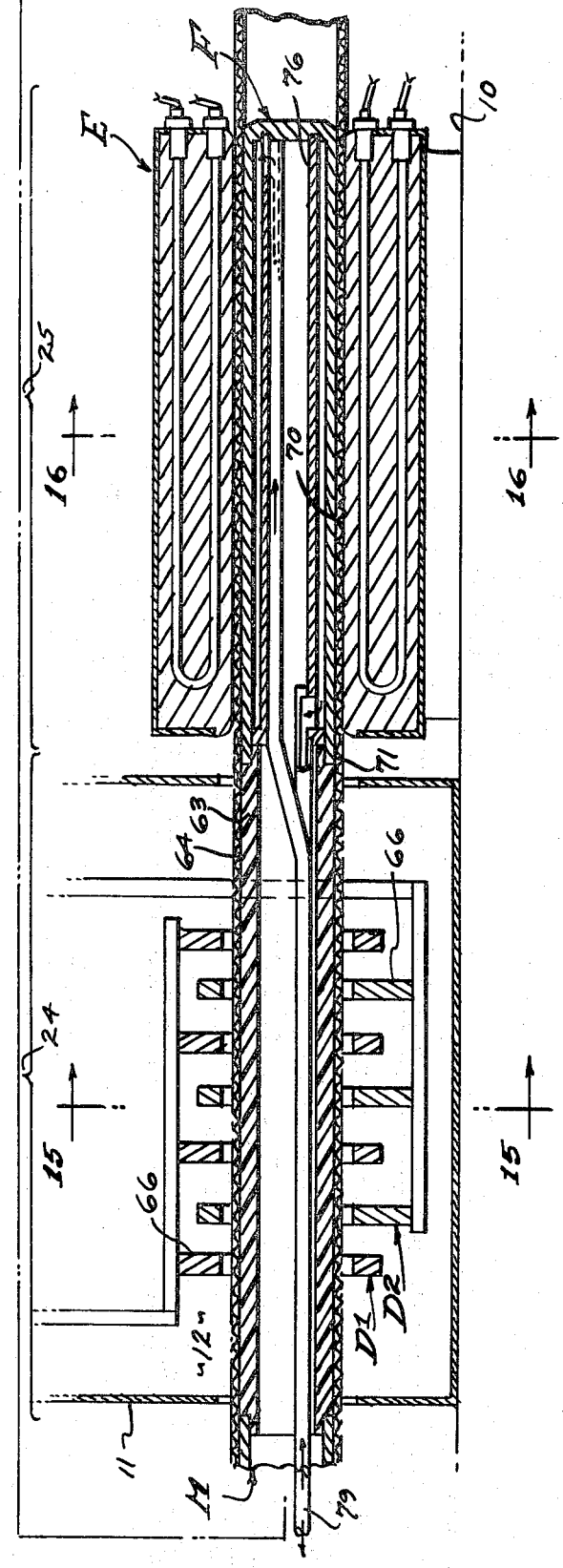
Fig.13.

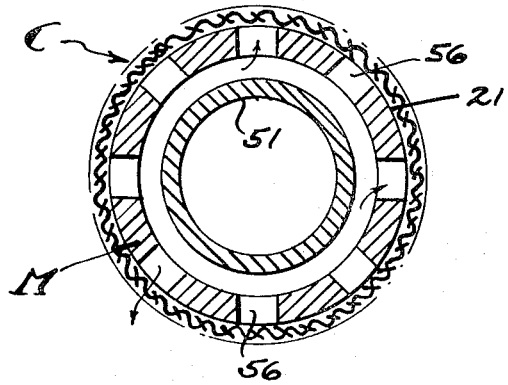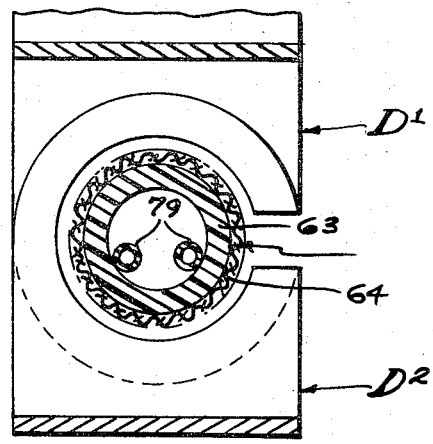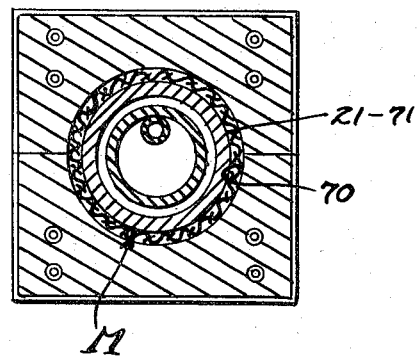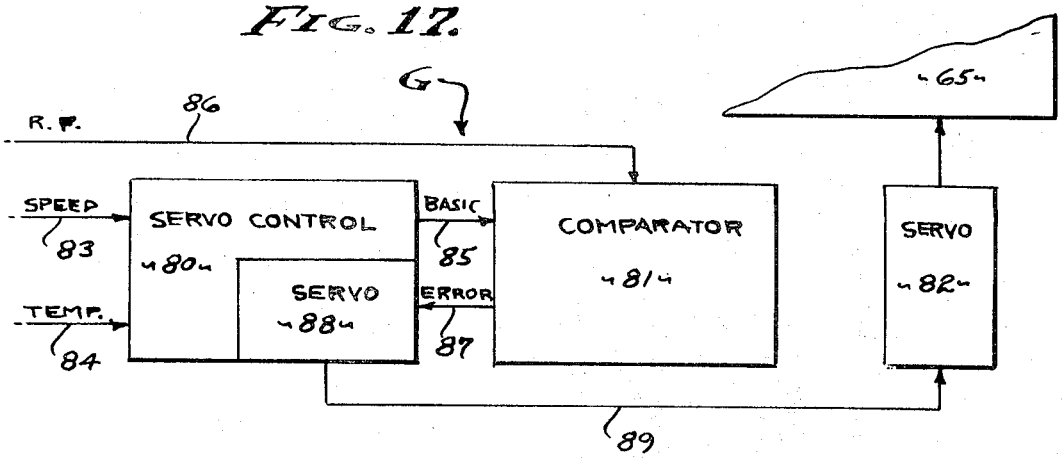

METHOD AND APPARATUS FOR LAMINATING, IMPREGNATING AND CURING CONTINUOUS TUBES

Reference is made to application Ser. No. 3,353 filed Nov. 2, 1970 which sets forth the pultrusion requirements and modifications herein disclosed.

BACKGROUND

Fully automatic machines are available for the continuous production of unlimited length, constant-profile composite elements issued in finished form from a shaping bushing and die. Such machines are referred to as "pultrusion machines" and employ dielectric curing within the shape forming head, the typical composite element being a laminiform of glass fibers impregnated with resin. Although the prior art pultrusion machines are capable of forming a wide variety of composite elements, the method of composite manufacture heretofore employed therein has limited the practical size or cross section of the product. Therefore, the range of products of such machines is, in fact, limited and the formation of large cross sections has been impossible, on a continuous unlimited length basis. Consequently, resort has been made to manual lay-up of large cross sections, formed and cured upon molds that are subsequently removed and reused to manufacture individual pieces.

It has been determined that the prior art deficiency is primarily in the "wet forming" of the lay-up when it is applied to forms or molds, as for example in the typical pultrusion machine characterized by a resin reservoir through which the laminae are drawn and thoroughly wetted before forming; and as a result, the resin impregnated laminae are difficult if not impossible to handle in large size (wide and/or thick strips). Thus, it is an object of this invention to establish the composite form prior to saturation with resin, and to the end that the initial formation of the composite is not restricted or hampered by heaviness due to saturation with resin and which has heretofore caused sagging and other deformations that characterize wet wrapping. Further, multi-layer composites with control over the placement of abutted and/or overlapped edges is an object of this invention with the advantage of selectively displaced seams of the multi-layers. With the present invention, the composite form and lay-up thus far referred to preceeds the step of resin impregnation, and it is a further object, therefore, to form a multi-layer composite upon a stationary and floating mandrel while utilizing a traction machine such as a "pultruder" which draws the laminiform and pulls it along the mandrel before resin impregnation and subsequent sizing and curing.

The prior art has employed the wet lay-up method hereinabove referred to and various modifications thereof; for example, the exterior application of resin but without assurance of saturation. In large sized lay-ups resin is painted on and allowed to soak into the laminiform, again a problematic and slow process. Therefore, it is an object of this invention to simultaneously saturate the previously dry lay-up and to purge air therefrom by a forceful method and/or apparatus which assures performance of the saturated impregnation required. With the present invention, the floating mandrel upon which the dry formed lay-up is wrapped is manifolded and supplied with pressured resin, and to the end that the lay-up is saturated from within and which causes lateral displacement of air, and with virtually complete elimination of air bubbles or pockets from the laminae. Wiping off of excess resin is included in this step of the process with wipers incorporated in the apparatus, said wiped resin being salvaged and subsequently reused.

Radio Frequency curing of resin impregnated composites has been employed by the prior art to produce epoxy resin impregnated shapes during their formation within the bushings and die tubes which establish the finished form thereof. Typical Radio Frequency curing means of this type operate with an 8KW capacity at 70MHz coupled to spaced electrodes of plate form placed at diametrically opposite sides of the shaping bushing and die tube; said bushing and tube being made of non-conducting materials conducive to the diathermy process of heating the composite; and all of which involves complexity restricting the expedient use of micro waves for heat curing. That is, the prior art pultrusion products are established by the bushing which contours flat bands of resin impregnated lamina to remove excess resin and arrange the same into the product profile followed by the die tube which is analagous to the conventional extruding die; and all of which involve non-floating rigidly positioned members from which the finished product issues. The present invention has as an object therefore, a unique Radio Frequency pre-heating means disassociated from the composite formation and sizing die and provided to attain full advantage of the temperature-time factor in curing the resin impregnated composite within a minimum of time. With the present invention, the saturated laminiform is circumferentially embraced by the spaced Radio Frequency electrodes, each electrode being a split ring conforming to the composite exterior configuration and closely and substantially surrounding the same.

The so called instantly cured composites of the prior art are restricted as to size and speed of production, as hereinabove pointed out, it being a general object of this invention to produce composite sections of unlimited size and at maximum rates of speed limited only by the temperature-time rate of cure. To these ends, the pre-heat before entry into the sizing die prepares the saturated composite for its most efficient cure, all of which is performed over the floating mandrel. With the present invention the laminae establishes a "fill" which fully occupies the annulus between the floating mandrel and surrounding female die, thereby supporting said mandrel. Further, it is an object to maintain heat within the laminiform wall and to this end fluidics is utilized to transmit heat through the mandrel in order to pass the Radio Frequency zone of pre-heating and which would otherwise establish an interference to any means formed of conductive materials; the fluid and conducting tubes therefor being formed of non-conductive materials within a non-metallic section of the said manifold. The female die is coextensive with the curing zone and is also heated so as to transmit heat into the laminiform wall.

It is an object of this invention to provide a method and apparatus for laminating, impregnating and curing tubes of unlimited length; advantageously employing Radio Frequency in a pre-heating means and which is provided with a unique grid tuning means, with a unique stepper control means, and with a unique synchronous servomechanism control means; and all of

SUMMARY OF INVENTION

The method and apparatus herein disclosed usefully employs a pultruder or pultrusion machine that involves an elongated bed 10 upon which a floating mandrel M is anchored at one end and over and around which the method is performed as by the particular apparatus means hereinafter described. The fabricating process progresses from the said one anchored end of the mandrel M and toward the other end of the bed 10 provided with an automatic cut-off saw S actuated by a target switch adjustable to the length of product to be produced and activating the saw to traverse the product and thereby cut a determined length therefrom. In accordance with the invention, the mandrel M terminates at the issuance of cured product from the sizing die (later described) and the pultruder has a pair of puller-grippers P which are independently shiftable and alternately disengageable with the finished produced intermediate the sizing die and cut-off saw S to accurately advance and maintain through-put speeds ranging up to 10 feet per mminute by means of alternately reciprocating said grippers. Operation of the pultruder is initiated by tying extended and unsaturated laminae to the near most gripper P and advancing the laminiform as circumstances require until the cured product is extended so as to reach normal gripping engagement with the said near most gripper.

It is to be understood that the pultruder or the pultrusion machine referred to generally herein is available in the prior art as a fully automated device capable of continuously advancing the product at a specified speed and to cut the continuous manufacture thereof to specified length; also that such a machine is provided with Radio Frequency generating means (not specifically shown) and a shielded enclosure 11 therefor establishing a tunnel 12 which accommodates the heat inducing electrodes (later described) and through which the mandrel M extends with the laminiform passing thereover for pre-heating within said tunnel.

Referring now to the method and apparatus of the present invention, a dry form lay-up of one or more lamina is warped onto the mandrel M over the anchored end portion thereof and pulled forwardly toward the other end by the grippers P, said dry form lay-up being performed by apparatus means in the embodiment shown and described as follows: The composite illustrated herein is a three layer laminiform product and therefore requires three wrapping means A, A' and A" which are essentially alike and which are rotatively displaced so that the resulting laminae joints are circumferentially spaced. The several means A, A' and A" are progressively sequential along the mandrel M, the means A being rotatively positioned at 120° (looking forwardly), the means A' being positioned at 0°, and the means A" being positioned at 240°. The wrapping means are sequentially followed by serving means B spaced forwardly from the last mentioned wrapping means A" and revolveably encompassing the mandrel M and the laminiform wrapped thereon to apply a binding thereto. The method involves a resin impregnation following the dry form lay-up and which is carried out by apparatus means as follows: The mandrel M is manifolded throughout a substantially extensive section or portion thereof sequentially following the serving means B, there being resin supply means C injecting resin through the mandrel and into the manifold for internal injection into and for impregnating the laminiform advanced thereover. The method involves pre-heating following the resin impregnation of the laminiform and which is carried out in the apparatus by the provision of Radio Frequency electrodes D1 and D2 within the tunnel 12 above described. The method involves sizing and curing of the saturated laminiform following the pre-heating thereof and which is carried out in the apparatus by the provision of a heated die E that encompasses the laminiform over a substantial length thereof for the application of heat throughout a time period determined by the rate of travel. The die E has its compliment in the heated terminal end portion F of the mandrel M and which is coextensive with the die to establish the temperature-time curing of the lamina-composite.

DRAWINGS

The various objects and features of this invention will be fully understood from the following detailed description of the typical preferred form and application thereof, through which description reference is made to the accompanying drawings, in which:

FIG. 1 is a side elevation of an apparatus embodying the present invention.

FIGS. 2, 3 and 4 are enlarged sectional views taken as indicated by lines 2—2, 3—3 and 4—4 on FIG. 1, being fragmentary views with the laminae removed for clarity.

FIG. 5 is a side view of the typical wrapping means shown in FIG. 2 being taken as indicated by line 5—5 on said FIG. 2.

FIG. 6 is a view similar to FIG. 5 showing the laminae being processed thereby.

FIG. 7 is a longitudinal view being taken as indicated by line 7—7 on on FIG. 6.

FIG. 8 is a fragmentary view being taken as indicated by line 8—8 on FIG. 5.

Figure 9:
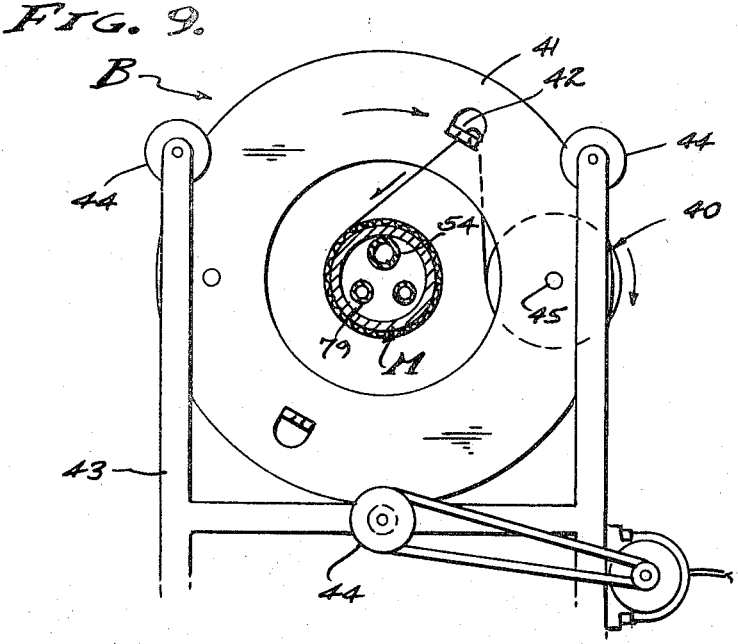
FIG. 9 is an enlarged transverse sectional view being taken as indicated by line 9—9 on FIG. 1.
Figure 11:
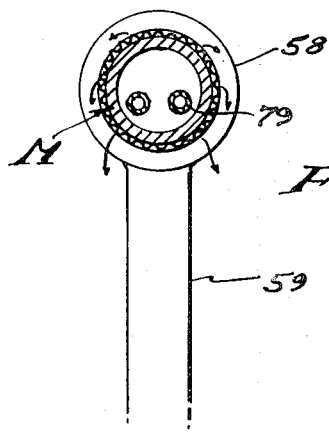
Figure 10:
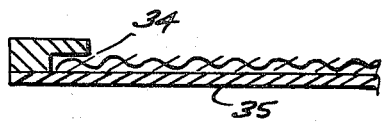
FIG. 10 is an enlarged fragmentary view taken as indicated by line 10—10 on FIG. 7.
Figure 12:
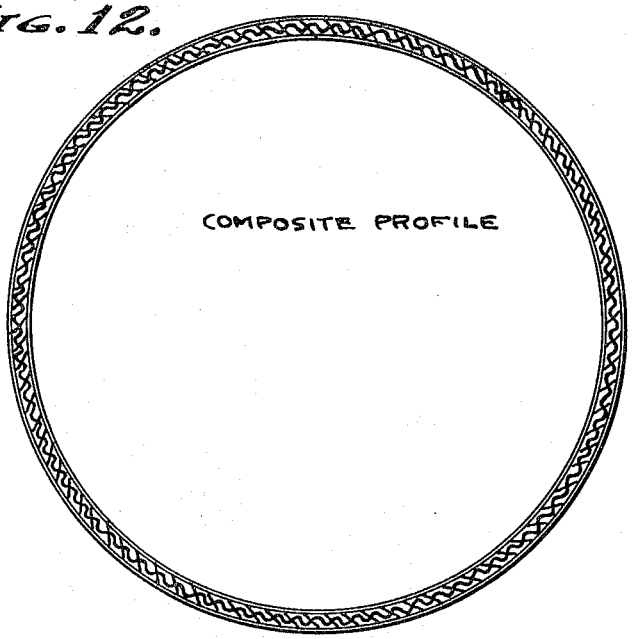

FIGS. 11 and 12 are enlarged transverse sectional views taken as indicated by lines 11—11 and 12—12 on FIG. 1.

FIG. 13 is an enlarged exploded view of the apparatus elements as shown in FIG. 1.

FIGS. 14, 15 and 16 are enlarged transverse sectional views taken as indicated by lines 14—14, 15—15 and 16—16 onn FIG. 13; and, FIG. 17 is a schematic diagram of the power control G which automates the heat applied as related to time.

PREFERRED EMBODIMENT

Referring now to the drawings and to the preferred embodiment of an apparatus conducting the method of the present invention, it will be clear from FIG. 1 that the dry form lay-up of the laminiform is completed by the means A, A', A" and B prior to resin impregnation by the means C, followed by sizing and curing of the composite produced by the means E and F which is disassociated from the preceeding pre-heating performed upon the saturated laminiform by the means D1 and D2. The processing of materials is dynamic and continuously moving over and along the longitudinally coextensive mandrel M that is anchored at its one exposed end and which characteristically floats within the confines of the "fill" provided by the laminiform wrapped, impregnated and cured thereon during the manufacture of the composite product. The method is practiced as follows, each step thereof being related to the preferred embodiment of the apparatus involving the means A through F and other related means that will be described in conjunction therewith.

The composite product shown herein is resin impregnated glass filled pipe that has a tubular profile and which is to be produced by a throughput process in continuous or unlimited length. The glass fill can be one or more layers of roving, mat or fabric, and is shown basically as a three layer laminiform structure with supplement laminae that reinforce and complete the "fill" and that contain and finish the exposed surfaces. It is to be understood that variations and modifications to the thickness, and to the number of and properties of the laminae can vary as circumstances require. In the embodiment shown, the pipe is a nominal 4 inch diameter with an eighth inch wall; and there is an inner heavy 2 ounce mat of glass fibers 15, there is intermediate glass cloth of heavy 24 ounce woven roving 16, and there is an outer heavy 2 ounce mat of glass fibers 17. The inner mat 15 is warped onto the mandrel M by the wrapping means A which also applies a filler of light thirteen ounce glass cloth 18. The intermediate roving 16 is warped onto the mandrel M by the wrapping means A' and, the outer mat 17 is warped onto the mandrel M by the wrapping means A" which also applies the finish cloth 19.

The means A, A' and A" are rotatively displaced at 120°, 0°, and 240° as shown, and they are essentially alike so that a description of one will suffice for all. The wrapping means A, A' and A" corporate with the mandrel M that is fixed to the bed 10 by means of a standard 20 at the back end of the pultrusion machine. The mandrel M is supportably anchored on an axis spaced above the bed 10 and is adapted to float horizontally as it extends forwardly in parallelism above the bed and coextensively with the process means to cooperate therewith as will be described. The mandrel M is tubular, with an outer diameter wall 21 establishing the inner diameter of pipe and with an open interior extending therethrough to pass liquid ducts for the delivery and return of fluids involved in the process and operation of the apparatus. Further, the mandrel M is sectional, involving a forming or lay-up section 22, an impregnation section 23, a pre-heat section 24, and a curing section 25; all of which are cooperatively related to process means as hereinafter described.

The method involves the dry form lay-up of each lamina by means of warping a strip of material over and guiding the same along a stationary form, and accordingly the wrapping means A, A' and A" each involve, generally, a strip supply means 26, a strip warping means 27 and a strip guide means 28. The strip material (15-18) is furnished in bolts which can be spliced one to another for continuity, and the several wrapping means are installed at sequential stations along the bed 10 as shown with the bolt of lamination materials supported laterally of the mandrel M by the supply means 26 in each instance. The wrapping means 26-28 are carried upon the bed 10 by means of a standard 30 supported by the bed and carrying a header 31 positioned coaxially of the mandrel M. In practice, the header 31 is a circular element that encompasses the mandrel M with clearance and supports the guide means 28 in the form of a sleeve telescopically positioned over the mandrel. In accordance with the invention, the sleeve has an inner diameter wall 32 spaced concentrically around the outer diameter wall 21 of mandrel M, leaving an annulus therebetween to freely pass the combined thickness of laminae in each instance. A feature of the invention is the support of mandrel M attained by the presence of "fill" in said annulus as established by the concentric separation of the inner and outer diameter walls 32 and 21, while simultaneously guiding the laminiform lay-up. The strip warping means 27 is carried by the sleeve of guide means 26 to surround the mandrel M and is comprised of a plate 33 with side margins spaced the same (initially parallel) as the side margins of the strip material to be warped onto the material. In practice, guide channels 34 overlie the opposite margins of the plate 33 through the entry portion 35 thereof which is flatened and extends laterally of the mandrel at, for example, 75°. In accordance with the invention, the warping means 27 is bilaterally symmetrical in its lateral projection to the side of the mandrel, and the guide channels 34 are each aligned with a reel 36 or bolt of the strip material to be formed; and as shown one or more strips are simultaneously fed onto the entry portion 35 between the guide channels 24. A feature is the simple bending (not compounded) of plate 33 from its flat entry portion 35 into opposite radially and inwardly convergent warp portions 37 that turn forwardly in the direction of laminiform movement, the guide sleeve being truncated to receive the natural bend of said plate. Another feature is the coordinated reduction of width in said warp portions 37, which are continuously joined to the truncated sleeve, gradually diminishing the total width of the plate margins. Thus, the strip of lamination material is entered into the guide annulus and folds over at the truncated joints of the sleeve and plate, the opposite side margins of the plate 33 overlapping with material clearance therebetween on the line of symmetry at the far side of the mandrel opposite the feed side. Consequently, the strip of lamination material is warped onto the mandrel as it is pulled through the annulus, the warped arc thereof increasing with said forward progression of the strip of material over the truncation lines and the strip of material coming together as a wrapping with a joint at said diametrically opposite far side. In practice, the mats or roving, and other strips, are overlapped along the lines of joinder thereof.

The dry form lay-up of this method includes the serving means B that applies a binding to the exterior of the laminiform structure so as to prevent separation of the abutted and/or overlapped lines of joinder at the exterior thereof. As shown, the serving means B is positioned sequentially following the issuance of the laminiform from the aforementioned wrapping means and involves, generally a filament supply means 40, a revolving cage 41, and a filament guide 42. The filament binding is applied as shown as a retainer and/or as a reinforcement to take hoop-stress so as to increase the strength of the pipe P in withstanding internal pressures. A standard 43 supports the means 40-42, there being a roller support for the revolving cage 41 and comprising circumferentially spaced rollers 44 and one of which is motor driven to tractably drive the cage. As shown, the cage 41 is essentially an open centered wheel that surrounds the mandrel M and laminiform wrapped thereon, being disposed in a plane normal to the axis thereof, and the rollers 44 being channeled so as to guide the cage 41 in said plane. The supply means 40 is a spool of thread or the like rotatable on a bobbin shaft 45 carried on the cage to revolve therewith, while the filament guide 42 is an eye or the like also carried on the cage to revolve therewith and spaced laterally of the mandrel M to feed the filament from the bobbin-spool and onto the laminiform.

From the foregoing it will be seen that the method provides a dry laminiform wrapped onto the lay-up section 22 of the mandrel and which according to this invention is next saturated with resin through the impregnation section 23 of the mandrel. The resin supply means C is provided for this next step of the process and which involves, generally, a pressured resin supply 50 and a manifold 51 opening through the outer diameter wall 21 of the mandrel throughout the impregnation section 23 thereof. As shown, the pressured resin supply 50 comprises a resin tank 52 in which a supply thereof is maintained, and a pressure regulated pump means 53. A delivery pipe 54 extends from the output of the pump means 53 and projects into the back end of mandrel M and extends to the impregnation section 23 thereof, where said delivery pipe discharges into a manifold 51 extending circumferentially of and coextensively with said section 23. The manifold 51 comprises a cylinder spaced concentrically inward from the inner diameter of the mandrel and closed at its ends, said mandrel having multi-perforations 56 and to the end that resin delivered by pump means 53 is forced from the manifold and through the laminiform wall to saturate the same while driving out all air by means of lateral displacement. Thus, the laminiform is internally wetted and visibly saturated. In practice, the laminiform is excessively saturated with resin and which is allowed to pour and/or drip therefrom; the excess resin being wiped from the laminiform by means of a ring-shaped wiper 58 carried on a standard 59 supported from the bed 10. As shown, the excess resin drops into a tray 60 and is returned through a line 61 to the tank 52.

The method involves pre-heating of the resin saturated laminiform and which involves dielectric heating employing Radio Frequency energy applied within the limits of the pre-heat section 24 of the mandrel M. Heating of this type involves the use of electrically non-conductive materials in the construction of the parts and elements closely associated with the heat zone, and accordingly the section 24 of mandrel M is made of dielectric material such as, for example silicone fiberglas 63 with a teflon coating 64. As shown, the dielectric section 24 is coupled into the mandrel M between the impregnation section 23 and the curing section 25, and is open through its interior for the passage of fluid ducts therethrough. In accordance with this invention, improved electrodes are provided for the efficient induction of heat into the resin saturated laminiform and which involves, generally, the electrodes D1 and D2 coupled to the output conductors of a Radio Frequency generator 65. The said electrodes are of unique form and each involves one or more split rings 66 that embrace the laminiform as it progresses over the pre-heat section 24. As shown, the electrodes D1 and D2 are alike with the separations thereof occuring along one side of the grouping made up of alternately spaced rings disposed in planes normal to the axis of the mandrel and each electrode having an inner diameter substantially spaced from the outside diameter of the laminiform being pre-heated. In carrying out this invention, the Radio Frequency generator 65 produces up to 8KW at 70MHz and to the end that a temperture in the range of 120° F. is attained in the saturated laminiform while moving forwardly at a rate of 8 foot per minute in processing the 4 inch pipe as specified.

The final step of this throughput method involves sizing and curing of the resin impregnated and pre-heated laminiform. It is significant that the forwardly advancing laminiform is supported by the die E and in turn supports the curing section 25 of mandrel M; the said mandrel and laminiform wrapped thereon being cantilevered forwardly from the standard and guide means 28 of the last active wrapping means, in the case illustrated the means A''. The die E in cooperation with the end portion F of the mandrel is the sizing and curing section of the apparatus which is separate from the preceeding Radio Frequency pre-heat. The die E has an inner cylinder wall 70 accurately formed to the outside diameter of the finished pipe P, while the mandrel section M or end portion 25 thereof having an outer cylinder wall 71 accurately formed to the inside diameter of the finished pipe P. Heat is applied to the laminiform through the said inner and outer cylinder walls 70 and 71 while the said laminiform is advanced therethrough at a maximum rate, and to these ends the walls 70 and 71 are smooth metallic walls, for example chrome plated walls. The cure temperature applied through the walls is up to 350°–400° F., which is a substantial increase over the pre-heat ambient temperature of 120° F., a curing temperature being selected for the particular epoxy resin involved so as to take full advantage of the differential time factor as related to the Temperature-Time cure determined by a maximum rate of travel coordinated with an optimum temperature.

The die E and mandrel section F are electrically heated and liquid heated respectively, and preferably the latter. Conductive components are permissive in the die E (thermostatically controlled) while the curing section 25 requires the transmission of heat energy through electrically non-conductive means; and to this end fluidics is employed in the terminal end portion F or curing section 25 of the mandrel and which comprises a fluid heat conductor 75 such as oil recirculated through a manifold 76 within the section 25 from an external tank 77 that is electrically heated (thermostatically controlled), all as shown. With the present invention, the heated fluid 75 from tank 77 is recirculated by a suitable pump 78 through lines 79 which are dielectric and/or electrically non-conductive throughout the pre-heating zone of mandrel section 24. As the sizing diameter 70 receives the laminiform for curing, the excessive resin is wiped therefrom at the entrance to the die E and drops therefrom into the tray 60 for return to tank 52.

From the foregoing, the method concept will be understood. The usual prior art operation of the pultrusion machine is carried on for the continuous throughput operation required and speed of production is commensurate with the full capabilities of the material involved as determined by the temperature-time relationship of the thermosetting resin employed, speeds in excess of 6 foot per minute being ordinary in processing the 4 inch pipe herein specified. Accordingly, an automated power control means G is provided to govern the energy output of the Radio Frequency generator 65 and which involves, generally, a primary servo control means 80 responsive to the throughput speed and cure temperature requirement, a secondary comparator means 81 responsive to the output of said primary servo and the prevailing Radio Frequency power output, and a servo power control 82 governing the power output of generator 65. The means 80 and 81 are electronic comparators or the like and each with an output signal responsive to a balance of input signals. The primary means 80 is responsive to a throughput speed signal (adjusted or prevailing) through line 83 and to a selected temperature requirement through line 84. The output of the primary means 80 is a basic power requirement through line 85 to the secondary comparator means 81 responsive thereto and to the prevailing Radio Frequency power output signal through line 86; thereby providing a power differential signal through control line 87. The said differential is essentially an error signal which is employed by the servo section 88 of means 80 to adjust the output signal through a line 89 to the servo power control means 82 which responds to adjust the applied Radio Frequency energy to the electrodes D1 and D2. Thus, the method and apparatus is completely automated with the temperature-time cure adjusted according to the throughput speed.

Having described only a typical preferred form and application of our invention, we do not wish to be limited or restricted to the specific details herein set forth, but wish to reserve to ourselves any modifications or variations that may appear to those skilled in the art:

We claim:

1. The method of laminating, impregnating and curing continuous unlimited length tubing composite of laminiform profile, and including; anchoring the one rear end of an elongated mandrel having a cross sectional configuration to establish the inner profile of the composite, dry forming at least one strip-shaped lamina over the mandrel and into encompassing conformity with said configuration thereof by wrapping the same longitudinally over the rear portion of the mandrel establishing a laminiform thereof while continuously advancing the same forwardly by traction applied thereto ahead of the front end of the mandrel, impregnating the previously dry laminiform with curable thermosetting liquid resin during its continuous advancement over the intermediate portion of the mandrel, and accelerating final cure of the liquid impregnated laminiform by applying heat during its continuous advancement over the front portion of the mandrel.

2. The method of producing unlimited length composite tube as set forth in claim 1 wherein the previously dry laminiform is impregnated and purged of air by flowing said curable liquid radially outward therethrough.

3. The methhod of producing unlimited length composite tube as set forth in claim 1, wherein the impregnated laminiform is pre-heated while advancing onto the front portion of the mandrel, and encompassing the pre-heated resin saturated laminiform within the confines of an exterior sizing die having a cross sectional configuration to establish the outer profile of the composite and applying the final cure heat thereto during its continued advancement over the front portion of the mandrel.

4. The method of producing unlimited length composite tube as set forth in claim 1, wherein the impregnated laminiform is pre-heated while advancing onto the front portion of the mandrel, and encompassing the pre-heated resin saturated laminform within the confines of an external sizing die having a cross sectional configuration to establish the outer profile of the composite and applying the final cure heat externally and internally thereto during its continued advancement over the front portion of the mandrel.

5. The method of producing unlimited length composite tube as set forth in claim 1, wherein the previously dry laminiform is impregnated and purged of air by flowing the thermosetting resin radially outward therethrough, and wherein the impregnated laminiform is pre-heated while advancing onto the front portion of the mandrel, and encompassing the pre-heated resin saturated laminiform within the confines of an exterior sizing die having a cross sectional configuration to establish the outer profile of the composite and applying the final cure heat thereto during its continued advancement over the front portion of the mandrel.

6. The method of producing unlimited length composite tube as set forth in claim 1 wherein the previously dry laminiform is impregnated and purged of air by flowing the thermosetting resin radially outward therethrough, and wherein the impregnated laminiform is pre-heated while advancing onto the front portion of the mandrel, and encompassing the pre-heated resin saturated laminiform within the confines of an external sizing die having a cross sectional configuration to establish the outer profile of the composite and applying the final cure heat externally and internally thereto during its continued advancement over the front portion of the mandrel.

* * * * *